US012594596B2

(12) United States Patent
Hu et al.

(10) Patent No.: US 12,594,596 B2
(45) Date of Patent: Apr. 7, 2026

(54) MICRODROPLET-BASED THREE-DIMENSIONAL (3D) LASER PRINTING SYSTEM AND METHOD

(71) Applicant: SHANGHAI JIAO TONG UNIVERSITY, Shanghai (CN)

(72) Inventors: Yongxiang Hu, Shanghai (CN); Guohu Luo, Shanghai (CN); Di Wu, Shanghai (CN); Yu Zhou, Shanghai (CN); Zhenqiang Yao, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 618 days.

(21) Appl. No.: 17/926,619

(22) PCT Filed: May 13, 2021

(86) PCT No.: PCT/CN2021/093485
§ 371 (c)(1),
(2) Date: Nov. 20, 2022

(87) PCT Pub. No.: WO2022/160506
PCT Pub. Date: Aug. 4, 2022

(65) Prior Publication Data
US 2023/0182200 A1     Jun. 15, 2023

(30) Foreign Application Priority Data

Jan. 26, 2021     (CN) ......................... 202110105753.9

(51) Int. Cl.
B22D 23/00       (2006.01)
B29C 64/268      (2017.01)
(Continued)

(52) U.S. Cl.
CPC .......... B22D 23/003 (2013.01); B29C 64/268 (2017.08); B33Y 10/00 (2014.12); B33Y 30/00 (2014.12)

(58) Field of Classification Search
None
See application file for complete search history.

(56) References Cited

U.S. PATENT DOCUMENTS 4,752,455 A        6/1988  Mayer
6,159,832 A  *  12/2000  Mayer ................... C23C 14/048
                                                                 438/584

(Continued)

FOREIGN PATENT DOCUMENTS

CN        101332728 A      12/2008
CN        101821111 A       9/2010
(Continued)

OTHER PUBLICATIONS

Zeyu Lei, et al., Surface-emitting surface plasmon polariton laser in a second-order distributed feedback defect cavity, ACS Photonics, 2019, pp. 1-19.

(Continued)

*Primary Examiner* — Binu Thomas
(74) *Attorney, Agent, or Firm* — Bayramoglu Law Offices

(57)          ABSTRACT

A microdroplet-based three-dimensional (3D) laser printing system, which includes a laser beam subsystem, a transparent donor substrate, voxel arrays, and the receiver substrate. By irradiating the voxel array with a pulsed laser beam deriving from the laser beam subsystem through the transparent donor substrate, the voxel array is melted and driven away from the transparent donor substrate to generate the ejecting microdroplet array and then deposited onto the receiver substrate. The 3D microstructure is printed in parallel by sequentially irradiating the voxel array and controlling the depositing locations of microdroplet arrays (Continued)

onto the receiver substrate. The system can avoid the satellite microdroplets generating, improve the printing efficiency and resolution, and obtain a wide process window.

10 Claims, 2 Drawing Sheets

(51) Int. Cl.
    *B33Y 10/00*            (2015.01)
    *B33Y 30/00*            (2015.01)

(56)            References Cited

U.S. PATENT DOCUMENTS

| | | | | |
|---|---|---|---|---|
| 6,437,284 | B1 * | 8/2002 | Okamoto | B23K 26/0732 |
| | | | | 219/121.73 |
| 2011/0097550 | A1 * | 4/2011 | Matusovsky | C23C 14/04 |
| | | | | 428/167 |
| 2014/0161998 | A1 | 6/2014 | Liu et al. | |
| 2017/0365484 | A1 * | 12/2017 | Kotler | B33Y 30/00 |
| 2019/0322036 | A1 * | 10/2019 | Zenou | B33Y 30/00 |

FOREIGN PATENT DOCUMENTS

| | | | |
|---|---|---|---|
| CN | 103878485 | A | 6/2014 |
| CN | 104439699 | A | 3/2015 |
| CN | 106825915 | A | 6/2017 |
| CN | 108326451 | A | 7/2018 |
| CN | 207823958 | U | 9/2018 |
| CN | 109581674 | A | 4/2019 |
| CN | 109911848 | A | 6/2019 |
| CN | 107206548 | B | 8/2019 |
| CN | 110756986 | A | 2/2020 |
| CN | 109581674 | B | 4/2020 |
| CN | 112171064 | A | 1/2021 |
| JP | 2011233597 | A | 11/2011 |

OTHER PUBLICATIONS

David A. Willis, et al., Microdroplet deposition by laser-induced forward transfer, Applied Physics Letters, 2005, p. 244103-1-244103-3, vol. 86.

A.I. Kuznetsov, et al., Laser-induced backward transfer of gold nanodroplets, Optics Express, 2009, pp. 18820-18825, vol. 17 No. 21.

M. Zenou, et al., Laser jetting of femto-liter metal droplets for high resolution 3D printed structures, Scientific Reports, 2015, pp. 1-10, 5:17265.

Jun Luo, et al., Printing Functional 3D Microdevices by Laser-Induced Forward Transfer, Small, 2017, pp. 1-5, 13(9), 1602553.

Qingfeng Li, et al., Generating liquid nanojets from copper by dual laser irradiation for ultra-high resolution printing, Optics Express, 2017, pp. 24164-24172, vol. 25 No. 20.

Yoshiki Nakata, et al., Nanodot array deposition via single shot laser interference pattern using laser-induced forward transfer, International Journal of Extreme Manufacturing, 2020, pp. 1-5, vol. 2 No. 025101.

* cited by examiner

S1: Preparing the voxel array by a focused laser beam to scan and cut

S2: Driving the voxel array by a pulsed laser beam to form the microdroplet array S4: Printing the 3D microstructure array in parallel S3: Governing the depositing position of the sequentially deposited microdroplet arrays by moving the receiver substrate

MICRODROPLET-BASED THREE-DIMENSIONAL (3D) LASER PRINTING SYSTEM AND METHOD

CROSS REFERENCE TO THE RELATED APPLICATIONS

This application is the national phase entry of International Application No. PCT/CN2021/093485, filed on May 13, 2021, which is based upon and claims priority to Chinese Patent Application No. 202110105753.9, filed on Jan. 26, 2021, the entire contents of which are incorporated herein by reference.

TECHNICAL FIELD

The present invention relates to the technical field of laser micro-nano additive manufacturing, particularly a microdroplet-based three-dimensional (3D) laser printing system and method.

BACKGROUND

Laser-induced forward transfer (LIFT) is a nozzle-free micro-nano additive manufacturing process with high material adaptability and resolution. In this process, a focused laser pulse is irradiated on the thin film (donor) covered on a transparent carrier (donor substrate); with the assistance of the thermal-mechanical effects of a pulsed laser, the thin donor film is melted and locally vaporized. Then, the molten film is ejected by the vapor driving, generating ejecting microdroplets. Those microdroplets sequentially deposit on the receiver substrate, printing the three-dimensional microstructures. Compared to other micro-additive manufacturing processes, LIFT is superior in printing the 3D microstructure of metals and semiconductors.

Generating smaller and more stable micro-droplets is critical to print high-resolution 3D microstructures. The diameter of the Micro-droplet in LIFT is determined by film thickness and laser spot size. D. A. Willis et al. (D. A. Willis and V. Grosu, Micro-droplet deposition by laser-induced forward transfer, Appl. Phys. Lett. 86, 244103, 2005) first focused a nanosecond pulse laser beam through a transparent substrate to a continuous thin metal film with a 700 nm thickness, producing the micron-size aluminum and nickel droplets. Xianmin ZHANG et al. (Xianmin ZHANG, Yilin SHAN, Kai L I, Chuangang TANG. A device and a method for laser-induced forward transfer of solder paste, 2019, CN109581674B) invented an apparatus and a method for transferring the nanoparticle ink paste by a focused laser pulse. A. I. Kuznetsov et al. (A. I. Kuznetsov, J. Koch, and B. N. Chichkov, Laser-induced backward transfer of gold nano-droplets, OPTICS EXPRESS, 17(21), 18820, 2009) focused on the spot of a femtosecond laser pulse to submicron levels by an oil immersion method to print a microsphere array with a sphere diameter of 300 nm. However, due to the influence of the waist size of the laser beam, the focus size of the laser spot is limited, which physically restricts the minimum volume of micro-droplet that can be generated. In addition, when the donor film is thinner, the required laser pulse width and energy are both smaller, and the process window for generating microdroplets becomes narrow (M. Zenou, A. Saar, Z. Kotler. Laser jetting of femtoliter metal droplets for high-resolution 3D printed structures. Scientific Reports, 5:17265, 2015). At the same time, when the laser spot is focused to a tiny state, the laser's working distance and range will drastically reduce, which leads to a failure in achieving both the resolution and efficiency in the LIFT process.

Laser-induced micro-droplet deposition can print complex 3D microstructures. Jun Luo et al. (Jun, Luo, Ralph, et al. Printing Functional 3D Microdevices by Laser-Induced Forward Transfer. small, 13, 1602553, 2017) printed the micro thermocouple by irradiating two continuous metal films with different materials. Xianmin ZHANG et al. (Xianmin ZHANG, Yang CHEN, Yilin SHAN. A method and device for preparing microlens array by laser-induced forward transfer, 2020, CN110756986A) discloses a method and device for printing a microlens array by LIFT of liquid material with a sacrifice layer. Z. Kotler et al. (Z. Kotler, M. Zenu. Oblique Laser Induced Forward Switching Jets, 2017, CN107206548B) invented an oblique LIFT of microdroplet that allows printing microstructure on vertical sidewalls. However, how to avoid satellite microdroplets and debris, broaden the printing process window range, and improve printing efficiency are urgent problems to be solved for the industrial application of the LIFT process.

Qing L I et al. (Qing L I, A. P. Alloncle, D. Grojo, et al. Generating liquid nanojets from copper by dual laser irradiation for ultra-high resolution printing. Optics Express, 25(20): 24164, 2017) proposed a double pulse LIFT, where a long laser pulse is first used to heat and melt the continuous metal film, and then a short laser pulse is adopted to eject the molten film to generate a jet. It increases the stability of the process and obtains a wider process window, but satellite-microdroplet generates in jet separating from the donor film.

In the current LIFT process, a single droplet is formed by focusing a single low-energy laser pulse on a continuous donor film. The efficiency is low, and it is challenging to realize high-efficiency printing for a large-scale 3D microstructure. Nakata et al. (Y. Nakata, E. Hayashi, K. Tsubakimoto, et al. Nanodot array deposition via single shot laser interference pattern using laser-induced forward transfer. International Journal of Extreme Manufacturing, 2, 025101, 2020) proposed a method using diffractive optical elements (DOE) to generate an array of droplets using one laser pulse by splitting the laser beam, dramatically improving process efficiency. However, the problem of too many broken satellite droplets in the printing process still cannot be avoided.

Therefore, it is urgent to develop a high-efficiency and high-resolution printing method that can avoid the satellite microdroplet and generate large-scale and high-controllable microdroplets to solve the problems suffered by the current LIFT process.

SUMMARY

In response to the defects in the prior art, an objective of the present invention is to provide a microdroplet-based 3D laser printing system and method that can avoid satellite microdroplets during printing microstructures, broaden the process window and improve the printing efficiency.

The present invention provides a microdroplet-based 3D laser printing system, including a laser beam subsystem, a transparent donor substrate, voxel arrays, and a receiver substrate. The voxel arrays are covered on the transparent donor substrate.

A pulsed laser beam emitted from the laser beam subsystem is focused on the voxel array through the transparent donor substrate. The voxel array is melted and driven away from the transparent donor substrate, generating an ejecting microdroplet array. The ejecting microdroplet arrays sequentially deposit on the receiver substrate to print the 3D microstructure in parallel.

Preferably, the laser beam subsystem can generate a pulsed laser beam that irradiates a plurality of voxels.

Preferably, the laser beam subsystem includes a pulsed laser source, a beam expander, and a beam shaper. A Gaussian laser beam emitted from the pulsed laser source is transformed into a hat-top pulsed laser beam after going through the beam expander and the beam shaper.

Preferably, the laser beam subsystem also includes a scanning galvanometer and an unfocused field lens. The hat-top pulsed laser beam irradiates vertically onto the voxel array by the scanning galvanometer and the unfocused field lens.

Preferably, the microdroplet-based 3D laser printing system also includes a 3D motion platform and a coaxial charge-coupled device (CCD). With the assistance of the coaxial CCD and the 3D motion platform, the depositing positions of the microdroplet array can be regulated.

The present invention provides a microdroplet-based 3D laser printing method. The microstructures are printed in parallel by sequentially depositing the microdroplet arrays.

Preferably, the method includes the following steps.

Step S1. Preparing the voxel array by laser patterning the continuous thin film with a focused laser beam.

Step S2. Melting and driving the voxel array to detach away from the transparent donor substrate by a pulsed laser beam, generating the ejecting microdroplet array.

Step S3. Governing the depositing position of the ejecting microdroplet array onto the receiver substrate by moving the 3D motion platform.

Step S4. Repeating steps S2 to S3 to sequentially deposit the microdroplet arrays onto the receiver substrate, realizing the 3D microstructure printing in parallel after solidification.

Preferably, the step S1 includes:

Step S11. Sputtering a continuous thin film on the transparent donor substrate, and replacing the unfocused field lens with a focused field lens.

Step S12. Focusing the laser beam onto the thin film by the focused field lens to cut the continuous thin film.

Step S13. Governing the focused laser beam to pattern the continuous thin film by the scanning galvanometer, obtaining the voxel array covered on the transparent donor substrate.

Step S14. Switching the focused field lens to the unfocused field lens after preparing the voxel array.

Preferably, the step S3 includes:

Step S31. First, calibrating the relative position between the voxel array and the receiver substrate using the coaxial CCD.

Step S32. Controlling the receiver substrate to move directly below the voxel array by moving the 3D motion platform and determining the depositing position of the first microdroplet array.

Step S33. Moving the previously deposited microdroplet array directly below the following voxel array to be irradiated by the pulsed laser beam and offsetting the planar position between the voxel array and the previously deposited microdroplet array according to the geometric features to be printed, realizing to regulate the relative locations of the two successive deposited microdroplet arrays.

Preferably, when performing LIFT of the voxel array, the voxel array covers the bottom of the transparent donor substrate, and the pulsed laser beam first goes through the transparent donor substrate and then irradiates on the voxel array.

When preparing the voxel array by laser patterning, the transparent donor substrate is flipped, ensuring that the continuous thin film covers its upper surface, and the focused laser beam is directly irradiated on the continuous thin film.

Compared to the prior art, the present invention has the following advantages.

1. By patterning the continuous thin film to an independent voxel array, the present invention makes it possible to avoid the debris and satellite microdroplets during microdroplets separating from the transparent donor substrate, which is suffered by the LIFT based on the continuous thin film.

2. In the present invention, a large-scale microdroplet array is generated by irradiating the voxel array with a large-spot laser pulse, which realizes to print microstructure array in parallel and significantly improves the printing efficiency.

3. By reducing the voxel size to decrease the microdroplet diameter, the present invention can realize the microstructure's high-resolution printing without changing the laser pulse's spot size.

4. In the present invention, the microdroplet-based 3D laser printing process is divided into voxel array patterning and transferring so that the process is more stable and controllable, and the printing quality, efficiency, and resolution are ensured.

BRIEF DESCRIPTION OF THE DRAWINGS

Other features, objects, and advantages of the present invention will become clearer by reading the detailed description of non-limiting embodiments made with reference to the following drawings.

Figures 1, 2:
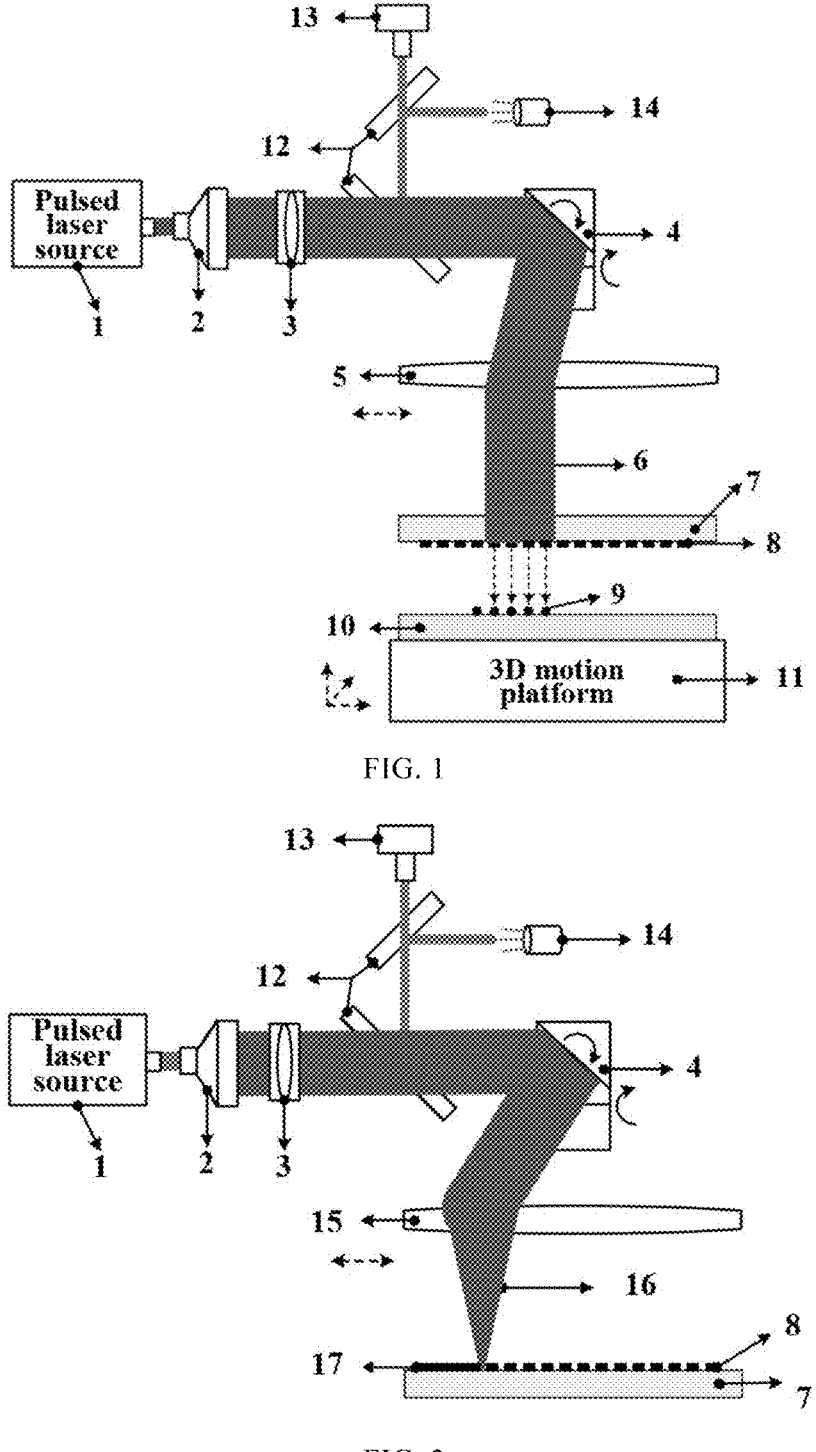
FIG. 1 is a schematic diagram showing an apparatus for printing the 3D microstructure by the LIFT of the voxel array in the present invention.
FIG. 2 is a schematic diagram showing an apparatus with a focused pulsed laser beam that patterns the continuous thin film to the voxel array of the present invention.

In the drawings, the reference numbers are represented as follows: pulsed laser source 1; beam expander 2; beam shaper 3; scanning galvanometer 4; unfocused field lens 5; pulsed laser beam 6; transparent donor substrate 7; voxel array 8; microdroplet array 9; receiver substrate 10; 3D motion platform 11; dichroic mirror 12; CCD camera 13; light-emitting diode (LED) 14; focused field lens 15; focused laser beam 16; and continuous thin film 17.

DETAILED DESCRIPTION OF THE EMBODIMENTS

As follows, the present invention will be described in detail in combination with specific embodiments. The following embodiments are beneficial for those skilled in the art to further understand the present invention but are not intended to limit the present invention. It should be noted that for those skilled in the art, various changes and improvements without departing from the ideas of the present invention can be made and should fall within the scope of the present invention.

As shown in FIG. 1, the present invention provides a microdroplet-based 3D laser printing system that includes the laser beam subsystem, the transparent donor substrate 7, the independent voxel array 8, the microdroplet array 9, and the receiver substrate 10. The pulsed laser beam 6 irradiates the voxel array 8 through the transparent donor substrate 7, resulting in the voxel array 8 being heated and molten. The melted voxel array 8 is driven away from the transparent donor substrate 7 to form the ejecting microdroplet array 9 and deposited onto the receiver substrate 10. The 3D microstructure is printed in parallel by sequentially irradiating the voxel array 8 and controlling the depositing positions of the generated microdroplet array 9 onto the receiver substrate 10.

Further, the laser beam subsystem includes the pulsed laser source 1, the beam expander 2, the beam shaper 3, the scanning galvanometer 4, and the unfocused field lens 5. The pulsed laser source 1 is provided at one end of beam expander 2, and the beam shaper 3 is provided at the other end of beam expander 2. Following the beam shaper 3, the scanning galvanometer 4 and the unfocused field lens 5 are arranged, respectively. The transparent donor substrate 7 is placed under the unfocused field lens 5. The voxel array 8 covers the bottom of the transparent donor substrate 7. The receiver substrate 10 is located under the transparent donor substrate 7 and parallel to the transparent donor substrate 7.

Further, the moving of the receiver substrate 10 is governed by the 3D motion platform 11 to regulate the depositing positions of the microdroplet array 9. And the receiver substrate 10 is installed on the 3D motion platform 11. The coaxial CCD includes the CCD camera 13, the LED 14, and the dichroic mirror 12. The dichroic mirror 12 is arranged between the beam shaper 3 and the scanning galvanometer 4. The CCD camera 13 is arranged above the dichroic mirror 12, and the LED 14 is arranged on one side of the dichroic mirror 12.

Working Principle.

The Gaussian laser emitted from the pulsed laser source 1 is shaped into a large-diameter hat-top pulsed laser beam 6 with spatial energy uniformly distributed after going through the beam expander 2 and the beam shaper 3. The pulsed laser beam 6 irradiates vertically onto the voxel array 8 through the scanning galvanometer 4, the unfocused field lens 5 and the transparent donor substrate 7. Then, the voxel array 8 is heated, melted, and detached away from the transparent donor substrate 7 to generate the ejecting microdroplet array 9. The ejecting microdroplet array flies downward and deposits onto the receiver substrate 10. With the assistance of the scanning galvanometer 4 and the 3D motion platform 11, the voxel arrays 8 are sequentially irradiated, and the generated microdroplet arrays 9 gradually deposit on different locations of the receiver substrate 10. The deposited microdroplet arrays 9 pile up to print the 3D microstructure in parallel.

Since the voxels in the voxel array 8 are independent, it is likely to avoid the flow instability to generate satellite microdroplets during the ejecting microdroplet separating from the continuous thin film 17 that is suffered by the LIFT based on the continuous thin film. Meanwhile, a large-scale microdroplet array 9 can be obtained by irradiating the voxel array 8 using a large-spot laser pulse. Moreover, the microdroplet array 9 depositing realizes the parallel printing of 3D microstructure, which significantly improves printing efficiency. And a smaller-size microdroplet can be obtained by reducing the voxel size to increase the resolution of the printed microstructure without decreasing the spot size of the pulsed laser beam. Thus, the present invention overcomes the limitation that printing resolution and efficiency cannot be achieved simultaneously in the LIFT of the continuous thin film 17.

Further, the beam diameter of the pulsed laser beam 6 is expanded through the beam expander 2, while its spatial energy distribution is still in a Gaussian state. Then using the beam shaper 3, a hat-top laser beam with uniform spatial energy distribution is obtained. Governing by the scanning galvanometer 4, the hat-top pulsed laser beam 6 can quickly irradiate on different locations of the voxel array 8. The unfocused field lens 5 ensures that the pulsed laser beam irradiates the voxel array 8 in different locations with constant laser fluence.

Figure 3:
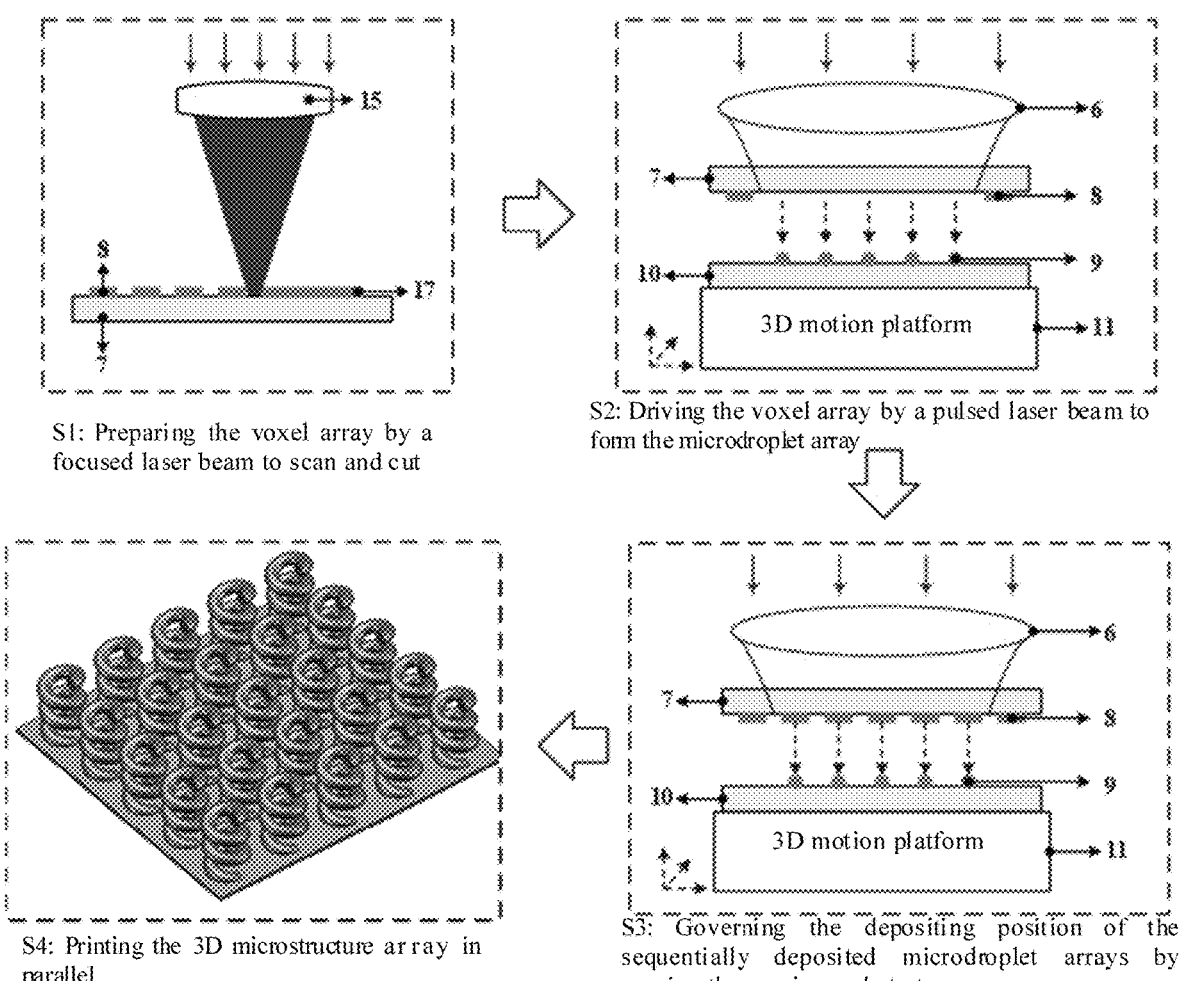
FIG. 3 is a schematic diagram showing the procedures of a microdroplet-based 3D laser printing method in the present invention.

As shown in FIG. 3, the present invention also provides a microdroplet-based 3D laser printing method for microstructures, including the following steps.

Step S1. The voxel arrays 8 are prepared using a focused laser beam to scan and cut the continuous thin film 17.

Step S11. The continuous thin film 17 is sputtered on the transparent donor substrate 7, while the unfocused field lens 5 is replaced with the focused field lens 15.

Step S12. Using the focused field lens 15, the pulsed laser beam 6 is focused onto the thin film 17.

Step S13. The focused laser beam 16 is controlled by the scanning galvanometer 4 to scan and cut the continuous thin film 17, and the voxel arrays 8 covered on the transparent donor substrate 7 are prepared.

Step S14. The focused field lens 15 is switched to the unfocused field lens 5 when the laser cutting is completed.

That is, as shown in FIG. 2, step S1 replaces the unfocused field lens 5 in FIG. 1 with the focused field lens 15, and the continuous thin film 17 on the upper surface of the transparent donor substrate 7. The hat-top pulsed laser beam 6 is focused onto the continuous thin film 17 by the focused field lens 15. And then, the continuous thin film 17 is patterned by reciprocating scanning along the front-back and left-right directions, respectively, under the control of the scanning galvanometer 4.

Step S2. The voxel array 8 is driven by the pulsed laser beam 6 to melt and detach away from the transparent donor substrate 7, generating the ejecting microdroplet array 9 to be deposited onto the receiver substrate 10.

Step S3. The depositing positions of the sequentially depositing microdroplet array 9 are controlled by moving the receiver substrate 10.

Step S31. First, the relative position between the voxel array 8 and the receiver substrate 10 is calibrated through the coaxial CCD.

Step S32. The receiver substrate 10 is moved directly below the voxel array 8 by the 3D motion platform 11, and the depositing position of the first microdroplet array 9 is determined.

Step S33. The previous transferred and deposited microdroplet array 9 is moved directly below the following voxel array 8. The planar position offset between the voxel array 8 and the previously deposited microdroplet array 9 is fine-tuned according to the geometric features of the printed 3D microstructure.

Step S4. Step S3 is repeated to sequentially deposit the microdroplet array 9 and print the 3D microstructure in parallel.

When the unfocused field lens 5 is in the laser beam subsystem, the function of LIFT of the voxel arrays 8 is configured. When the focused field lens 15 is in the laser beam subsystem, the function of laser patterning the continuous thin film 17 to the voxel arrays 8 is configured. Thus, one laser beam subsystem realizes the laser patterning and transfer of the voxel arrays 8.

The present invention provides the relative locations among the transparent donor substrate 7, the continuous thin film, and the voxel array. The transparent donor substrate 7 can flip vertically to adjust the thin film or voxel array 8 covered on its upper or lower surface. When transferring the voxel arrays 8, the voxel arrays 8 are arranged on the lower surface of the transparent donor substrate 7, and the laser pulse first goes through the transparent donor substrate 7. When patterning the thin film to prepare the voxel arrays 8, the laser beam does not require going through the transparent donor substrate 7. The continuous thin film 17 is located on the upper surface of the transparent donor substrate 7, which can avoid the voxel array peeling from the transparent donor substrate 7 during laser cutting.

In the description of the present application, it must be understood that the orientation or positional relationship indicated by the terms "upper/above", "lower/under/below", "front", "back", "left", "right", "vertical", "horizontal", "top", "bottom", "inside", "outside", and the other terms are based on the orientation or positional relationship shown in the drawings and are used only to facilitate and simplify the description of the present application, not to indicate or imply that the device or element referred to must have a particular orientation, be constructed or operated in a particular orientation, and therefore cannot be construed as a limitation of the present application.

Specific embodiments of the present invention have been described above. It must be understood that the present invention is not limited to the specific embodiments described above, and those skilled in the art may make various changes or modifications within the scope of the claims, which do not affect the substance of the present invention. The embodiments of the present application and the features in the embodiments may be combined with each other at will without conflict.

What is claimed is:

1. A microdroplet-based three-dimensional (3D) laser printing system, comprising a laser beam subsystem, a transparent donor substrate, a voxel array, a microdroplet array, and a receiver substrate;

wherein a pulsed laser beam emitting from the laser beam subsystem is focused on the voxel array through the transparent donor substrate; the voxel array is melted and driven away from the transparent donor substrate, generating an ejecting microdroplet array; the ejecting microdroplet arrays sequentially deposit on the receiver substrate to print a 3D microstructure in parallel, wherein the laser beam subsystem is configured to generate the pulsed laser beam and irradiate on the voxel array, wherein the laser beam subsystem further comprises a scanning galvanometer and an unfocused field lens, and the pulsed laser beam irradiates onto the voxel array with a constant laser fluence in different locations by the scanning galvanometer and the unfocused field lens.

2. The microdroplet-based 3D laser printing system according to claim 1, wherein the laser beam subsystem comprises a pulsed laser source, a beam expander, and a beam shaper; and the laser beam, emitted from the pulsed laser source, is shaped to the pulsed laser beam after going through the beam expander and the beam shaper.

3. The microdroplet-based 3D laser printing system according to claim 1, wherein the microdroplet-based 3D laser printing system further comprises a 3D motion platform and a coaxial charge-coupled device (CCD); and with the assistance of the coaxial CCD and the 3D motion platform, a motion of the receiver substrate is controlled to regulate the depositing position of the microdroplet array.

4. A microdroplet-based 3D laser printing method, wherein a microdroplet-based 3D laser printing is performed by a microdroplet-based 3D laser printing system, wherein the microdroplet-based three-dimensional (3D) laser printing system comprises a laser beam subsystem; a transparent donor substrate; a voxel array; a microdroplet array; and a receiver substrate, wherein a pulsed laser beam emitting from the laser beam subsystem is focused on the voxel array through the transparent donor substrate, the voxel array is melted and driven away from the transparent donor substrate, generating an ejecting microdroplet array, the ejecting microdroplet arrays sequentially deposit on the receiver substrate to print a 3D microstructure in parallel, wherein the laser beam subsystem is configured to generate the pulsed laser beam and irradiate on the voxel array, wherein the laser beam subsystem further comprises a scanning galvanometer and an unfocused field lens, and the pulsed laser beam irradiates onto the voxel array with a constant laser fluence in different locations by the scanning galvanometer and the unfocused field lens.

5. The microdroplet-based 3D laser printing method according to claim 4, comprising the following steps:

step S1: preparing the voxel array using a focused laser beam to cut the continuous thin film;

step S2: melting and driving the voxel array by the pulsed laser beam to detach away from the transparent donor substrate and generating the ejecting microdroplet array to be deposited onto the receiver substrate;

step S3: governing a depositing position of the ejecting microdroplet array onto the receiver substrate by moving the 3D motion platform; and step S4: repeating steps S2 to S3 to sequentially deposit the microdroplet arrays onto the receiver substrate, realizing a 3D microstructure printing in parallel after solidification.

6. The microdroplet-based 3D laser printing method according to claim 4, wherein step S1 comprises:

step S11: sputtering a continuous thin film on the transparent donor substrate, and replacing an unfocused field lens with a focused field lens;

step S12: focusing the laser beam onto the thin film by the focused field lens to cut the continuous thin film;

step S13: governing a focused laser beam to pattern the continuous thin film by the scanning galvanometer and obtaining the voxel array covered on the transparent donor substrate; and step S14: switching the focused field lens to the unfocused field lens after preparing the voxel array.

7. The microdroplet-based 3D laser printing method according to claim 4, wherein step S3 comprises:

step S31: first, calibrating a relative position between the voxel array and the receiver substrate using a coaxial CCD;

step S32: controlling the receiver substrate to move directly below the voxel array by moving a 3D motion platform and determining the depositing positions of the first microdroplet array; and step S33: moving the previously deposited microdroplet array directly below a next voxel array to be irradiated by the pulsed laser beam and offsetting a planar position between the voxel array and the previously deposited microdroplet array according to geometric features to be printed, realizing to regulate relative locations of two successive deposited microdroplet arrays.

8. The microdroplet-based 3D laser printing method according to claim 4, wherein when performing Laser-induced forward transfer (LIFT) of the voxel array, the voxel array covers a bottom of the transparent donor substrate, and the pulsed laser beam first goes through the transparent donor substrate and then irradiates on the voxel array;

when preparing the voxel array by laser patterning, the transparent donor substrate is flipped, ensuring that a continuous thin film covers an upper surface of the transparent donor substrate, and a focused laser beam is directly irradiated on the continuous thin film.

9. The microdroplet-based 3D laser printing method according to claim 4, wherein in the microdroplet-based 3D laser printing system, the laser beam subsystem comprises a pulsed laser source, a beam expander, and a beam shaper; and the laser beam, emitted from the pulsed laser source, is shaped to the pulsed laser beam after going through the beam expander and the beam shaper.

10. The microdroplet-based 3D laser printing method according to claim 4, wherein the microdroplet-based 3D laser printing system further comprises a 3D motion platform and a coaxial charge-coupled device (CCD); and with the assistance of the coaxial CCD and the 3D motion platform, a motion of the receiver substrate is controlled to regulate the depositing position of the microdroplet array.

\* \* \* \* \*